United States Patent
Guo et al.

(10) Patent No.: US 12,376,102 B2
(45) Date of Patent: Jul. 29, 2025

(54) HANDLING OF ORPHAN SYMBOLS IN SHARED SPECTRUM

(71) Applicant: Qualcomm Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/004,056

(22) PCT Filed: Aug. 19, 2020

(86) PCT No.: PCT/CN2020/109953
§ 371 (c)(1),
(2) Date: Dec. 31, 2022

(87) PCT Pub. No.: WO2022/036579
PCT Pub. Date: Feb. 24, 2022

(65) Prior Publication Data
US 2023/0262689 A1    Aug. 17, 2023

(51) Int. Cl.
*H04W 72/1268* (2023.01)
*H04L 1/08* (2006.01)
*H04L 27/26* (2006.01)

(52) U.S. Cl.
CPC .......... *H04W 72/1268* (2013.01); *H04L 1/08* (2013.01); *H04L 27/2607* (2013.01)

(58) Field of Classification Search
None
See application file for complete search history.

(56) References Cited

U.S. PATENT DOCUMENTS

| 8,520,718 | B2 | 8/2013 | Luo et al. | |
| 11,252,753 | B2 * | 2/2022 | Chen | H04W 72/23 |
| 12,232,107 | B2 * | 2/2025 | Gerami | H04L 1/08 |
| 12,256,369 | B2 * | 3/2025 | Yao | H04L 5/1469 |

(Continued)

FOREIGN PATENT DOCUMENTS

| WO | 2010148340 A1 | 12/2010 |
| WO | 2019062640 A1 | 4/2019 |

OTHER PUBLICATIONS

International Search Report and Written Opinion—PCT/CN2020/109953—ISA/EPO—May 18, 2021.

(Continued)

*Primary Examiner* — Otis L Thompson, Jr.
(74) *Attorney, Agent, or Firm* — QUALCOMM Incorporated

(57) ABSTRACT

Aspects of the present disclosure provide techniques for handling scenarios where a physical uplink shared channel (PUSCH) repetition is scheduled as a single symbol. According to certain aspects, a user equipment (UE) is configured to detect that a nominal physical uplink shared channel (PUSCH) repetition is to be segmented into one or more actual PUSCH repetitions that include a single symbol actual PUSCH repetition and take one or more actions to handle a symbol length gap in transmission due to the single symbol actual PUSCH repetition.

32 Claims, 12 Drawing Sheets

(56) References Cited

U.S. PATENT DOCUMENTS

| | | | |
|---|---|---|---|
| 2011/0143696 A1* | 6/2011 | Luo | H04B 7/0871 |
| | | | 455/101 |
| 2016/0337157 A1* | 11/2016 | Papasakellariou | H04L 1/1893 |
| 2017/0041948 A1 | 2/2017 | Cheng et al. | |
| 2019/0230683 A1 | 7/2019 | Akkarakaran et al. | |
| 2019/0372719 A1 | 12/2019 | Talarico et al. | |
| 2020/0314875 A1* | 10/2020 | Fakoorian | H04W 72/23 |
| 2020/0367208 A1* | 11/2020 | Khoshnevisan | H04W 72/23 |
| 2021/0007087 A1* | 1/2021 | Wei | H04L 1/18 |
| 2021/0022158 A1* | 1/2021 | Wei | H04L 1/0025 |
| 2021/0195653 A1* | 6/2021 | Lei | H04L 5/0053 |
| 2021/0203397 A1* | 7/2021 | Xiong | H04W 72/046 |
| 2021/0345406 A1* | 11/2021 | Myung | H04L 5/0094 |
| 2021/0360421 A1* | 11/2021 | Wang | H04W 74/006 |
| 2021/0360616 A1* | 11/2021 | Yi | H04L 5/0012 |
| 2021/0360660 A1* | 11/2021 | Cozzo | H04L 1/1887 |
| 2022/0015092 A1* | 1/2022 | Li | H04W 28/0858 |
| 2022/0046671 A1* | 2/2022 | Yang | H04L 5/0044 |
| 2022/0086872 A1* | 3/2022 | Shimezawa | H04W 72/1268 |
| 2022/0086873 A1* | 3/2022 | Wong | H04W 72/0446 |
| 2022/0104224 A1* | 3/2022 | Choi | H04L 5/0055 |
| 2022/0116968 A1* | 4/2022 | Choi | H04L 5/0053 |
| 2022/0124791 A1* | 4/2022 | Xu | H04W 72/20 |
| 2022/0132533 A1* | 4/2022 | Taherzadeh Boroujeni | |
| | | | H04B 7/2656 |
| 2022/0150928 A1* | 5/2022 | Choi | H04L 5/0044 |
| 2022/0159706 A1* | 5/2022 | Panteleev | H04L 5/0094 |
| 2022/0191846 A1* | 6/2022 | Ren | H04L 1/1887 |
| 2022/0201691 A1* | 6/2022 | Shi | H04W 72/53 |
| 2022/0210824 A1* | 6/2022 | Ying | H04L 1/1864 |
| 2022/0240267 A1* | 7/2022 | Fu | H04L 1/08 |
| 2022/0279549 A1* | 9/2022 | Takahashi | H04L 5/0044 |
| 2022/0279568 A1* | 9/2022 | Xu | H04L 1/1887 |
| 2022/0287073 A1* | 9/2022 | Wong | H04L 5/0053 |
| 2023/0124582 A1* | 4/2023 | Frenne | H04L 5/0012 |
| | | | 370/329 |
| 2023/0156674 A1* | 5/2023 | Yao | H04L 5/1469 |
| | | | 370/280 |
| 2023/0217447 A1* | 7/2023 | Guo | H04W 72/21 |
| | | | 370/329 |
| 2023/0224874 A1* | 7/2023 | Lin | H04L 5/0094 |
| | | | 370/336 |
| 2023/0232380 A1* | 7/2023 | Bhamri | H04L 1/08 |
| | | | 370/329 |

OTHER PUBLICATIONS

OPPO: "PUSCH Enhancement for URLLC," 3GPP TSG RAN WG1 #100bis, R1-2001775, E-Meeting, Apr. 20-30, 2020, (Apr. 30, 2020), chapter 2, 3 pages.

QUALCOMM: "Remaining Issues on PUSCH Enhancements for URLLC", 3GPP Draft, 3GPP TSG RAN WG1 #101e, R1-2004459, 3rd Generation Partnership Project (3GPP), Mobile Competence Centre, 650, Route Des Lucioles, F-06921 Sophia-Antipolis Cedex, France vol. RAN WG1, No. May 25, 2020-Jun. 5, 2020 May 16, 2020 (May 16, 2020), XP051886188, 4 Pages, Paragraph 4.

Apple Inc: "Discussion on Orphan Symbol Handling for Unlicensed Spectrum", 3GPP TSG RAN WG1 #102-e, R1-2006518, e-Meeting, Aug. 17- 28, 2020, 3rd Generation Partnership Project (3GPP), Mobile Competence Centre, 650, Route Des Lucioles, F-06921, Sophia-Antipolis Cedex, France, Aug. 8, 2020, pp. 1-3, XP052347893, The Whole Document.

Interdigital Inc: "On PUSCH Enhancements for eURLLC", R1-1907109, 3rd Generation Partnership Project, Mobile Competence Centre, 650, Route Des Lucioles, F-06921 Sophia-Antipolis Cedex, France, vol. RAN WG1, No. Reno, USA, Apr. 13, 2019-Apr. 17, 2019, May 13, 2019, 4 Pages, XP051728555, figure 1, section 3.

Panasonic: "Remaining Issues on URLLC PUSCH Enhancement", 3GPP TSG RAN WG1 #100, R1-2000589, e- Meeting, Febr. 24-Mar. 6, 2020, 3rd Generation Partnership Project (3GPP), Mobile Competence Centre, 650, Route Des Lucioles, F-06921, Sophia-Antipolis Cedex, France, Feb. 14, 2020, pp. 1-4, XP052343652, Sections 2.1 and 2.3.

Supplementary European Search Report—EP20949791—Search Authority—The Hague—Mar. 27, 2024.

Vivo: "PUSCH Enhancements for URLLC", 3GPP TSG RAN WG1 #100, R1-2000327, e-Meeting, Feb. 24-Mar. 6, 2020, 3rd Generation Partnership Project (3GPP), Mobile Competence Centre, 650, Route Des Lucioles, F-06921, Sophia-Antipolis Cedex, France, Feb. 14, 2020, pp. 1-4, XP052343392, The Whole Document.

* cited by examiner

500

502

DETECT THAT A NOMINAL PHYSICAL UPLINK SHARED CHANNEL (PUSCH) REPETITION IS TO BE SEGMENTED INTO ONE OR MORE ACTUAL PUSCH REPETITIONS THAT INCLUDE A SINGLE SYMBOL ACTUAL PUSCH REPETITION

504

TAKE ONE OR MORE ACTIONS TO HANDLE A SYMBOL LENGTH GAP IN TRANSMISSION DUE TO THE SINGLE SYMBOL ACTUAL PUSCH REPETITION

Option 1.1

| $l$ | $l$ | $T_{ext}$ |
|---|---|---|
| 0 | 0 | 71.4 us |
| 1 | 0 | 35.6 us |
| 2 | 0 | 17.9 us |

Option 1.2

| $l$ | $l$ | $T_{ext}$ |
|---|---|---|
| 0 | 0 | 55.4 us |
| 1 | 0 | 19.6 us |
| 2 | 0 | 1.9 us |

HANDLING OF ORPHAN SYMBOLS IN SHARED SPECTRUM

CROSS-REFERENCE TO RELATED APPLICATIONS

This application is a national stage application under 35 U.S.C. 371 of PCT/CN2020/109953, filed Aug. 19, 2020, which is hereby expressly incorporated by reference herein in its entirety as if fully set forth below and for all applicable purposes.

TECHNICAL FIELD

Aspects of the present disclosure relate to wireless communications, and more particularly, to techniques for handling scenarios where a physical uplink shared channel (PUSCH) repetition is scheduled as a single symbol.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance of UEs.

Certain aspects provide a method for wireless communications by a user equipment (UE). The method generally includes detecting that a nominal physical uplink shared channel (PUSCH) repetition is to be segmented into one or more actual PUSCH repetitions that include a single symbol actual PUSCH repetition and taking one or more actions to handle a symbol length gap in a transmission due to the single symbol actual PUSCH repetition.

Certain aspects provide an apparatus for wireless communications by a user equipment (UE). The apparatus generally includes a processing system configured to detect that a nominal physical uplink shared channel (PUSCH) repetition is to be segmented into one or more actual PUSCH repetitions that include a single symbol actual PUSCH repetition and take one or more actions to handle a symbol length gap in a transmission due to the single symbol actual PUSCH repetition.

Certain aspects provide an apparatus for wireless communications by a user equipment (UE). The apparatus generally includes means for detecting that a nominal physical uplink shared channel (PUSCH) repetition is to be segmented into one or more actual PUSCH repetitions that include a single symbol actual PUSCH repetition and means for taking one or more actions to handle a symbol length gap in a transmission due to the single symbol actual PUSCH repetition.

Certain aspects provide a user equipment (UE). The UE generally includes at least one antenna and a processing system configured to detect that a nominal physical uplink shared channel (PUSCH) repetition is to be segmented into one or more actual PUSCH repetitions that include a single symbol actual PUSCH repetition and take one or more actions, via the at least one antenna, to handle a symbol length gap in a transmission due to the single symbol actual PUSCH repetition.

Certain aspects provide a computer-readable medium for wireless communications by a user equipment (UE). The computer-readable medium generally includes codes executable to detect that a nominal physical uplink shared channel (PUSCH) repetition is to be segmented into one or more actual PUSCH repetitions that include a single symbol actual PUSCH repetition and take one or more actions to handle a symbol length gap in a transmission due to the single symbol actual PUSCH repetition.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to techniques for handling scenarios where a physical uplink shared channel (PUSCH) repetition is scheduled as a single symbol. This single symbol is referred to as an orphan symbol as conventional systems omit such single symbol transmissions. The handling may involve taking one or more actions designed to avoid losing channel access due to a transmission gap caused by the single symbol PUSCH repetition.

The following description provides examples of how a UE may handle orphan symbols and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
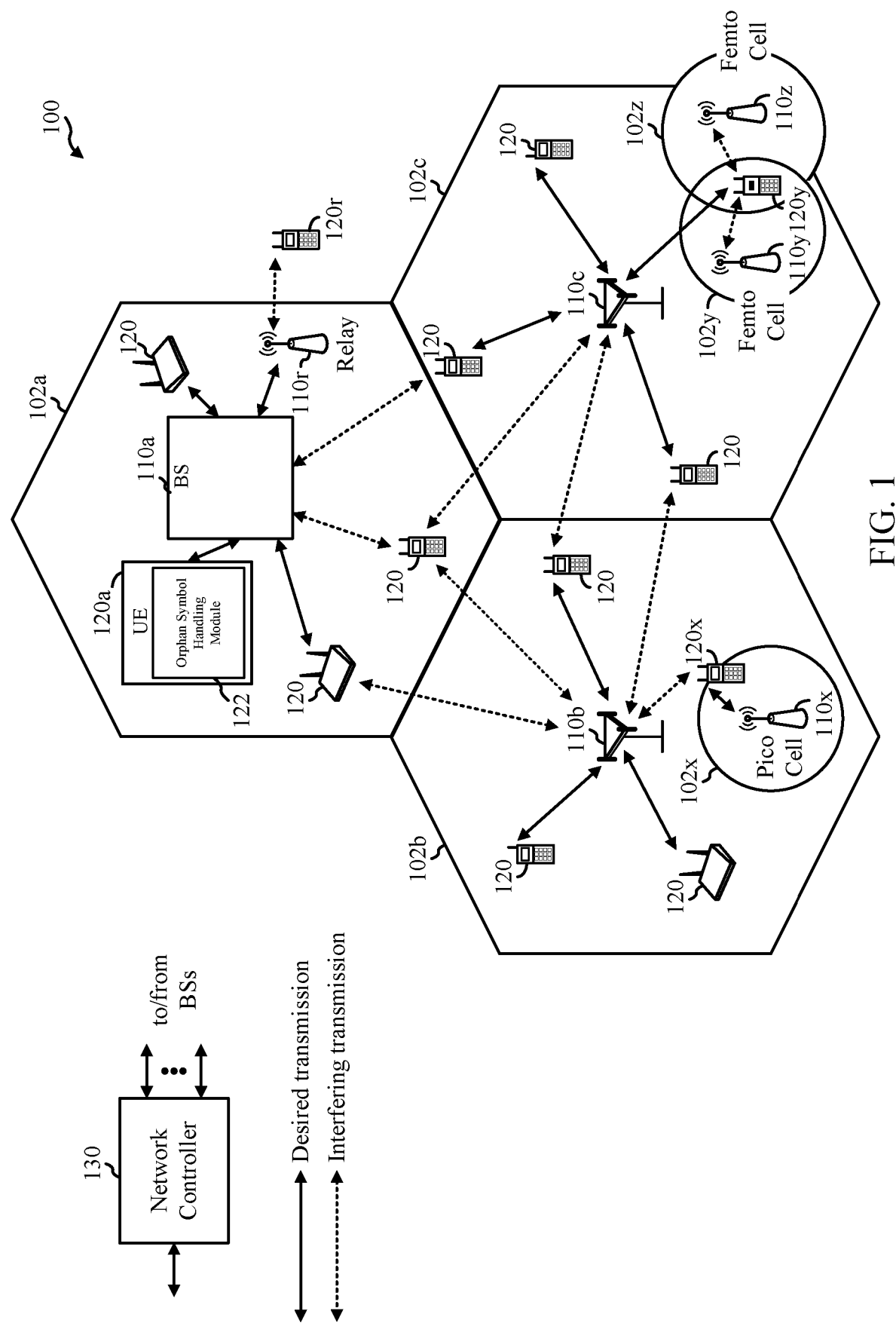
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include an orphan symbol handling module 122 that may be configured to perform (or cause UE 120a to perform) operations 500 of FIG. 5.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
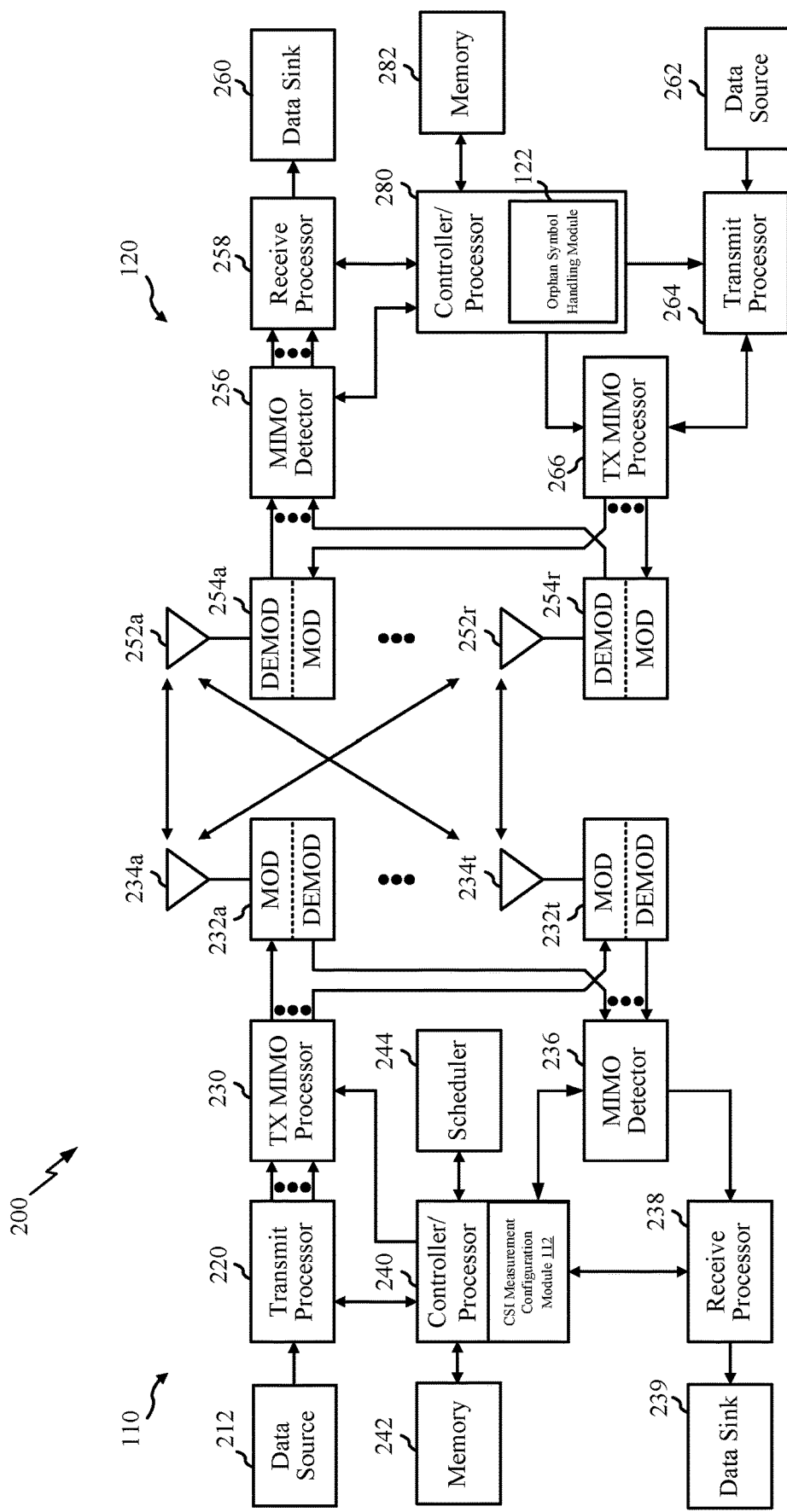
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has an orphan symbol handling module 122 that, as noted above, may be configured to perform (or cause UE 120 to perform) operations 500 of FIG. 5.

Figure 3A:
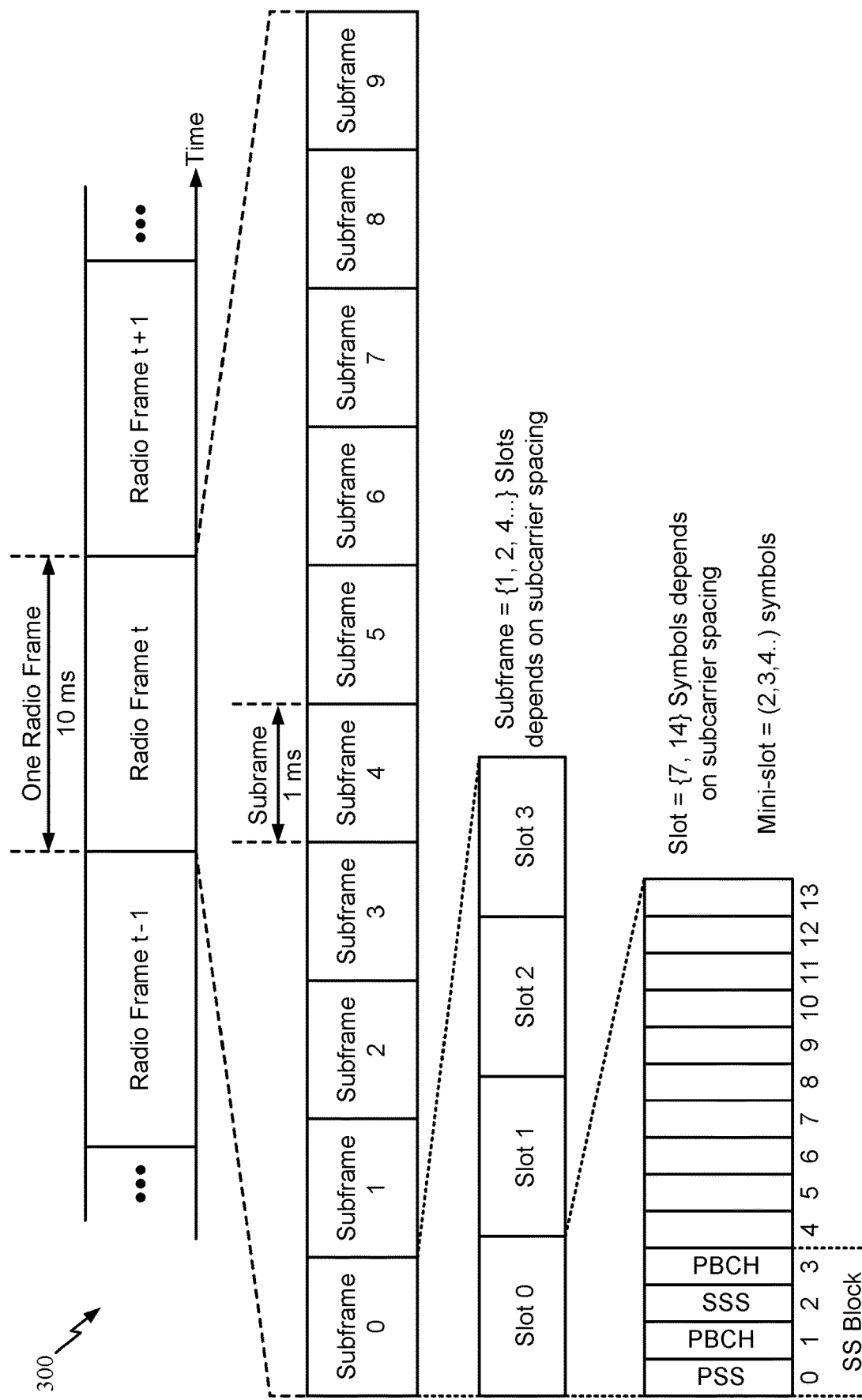
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
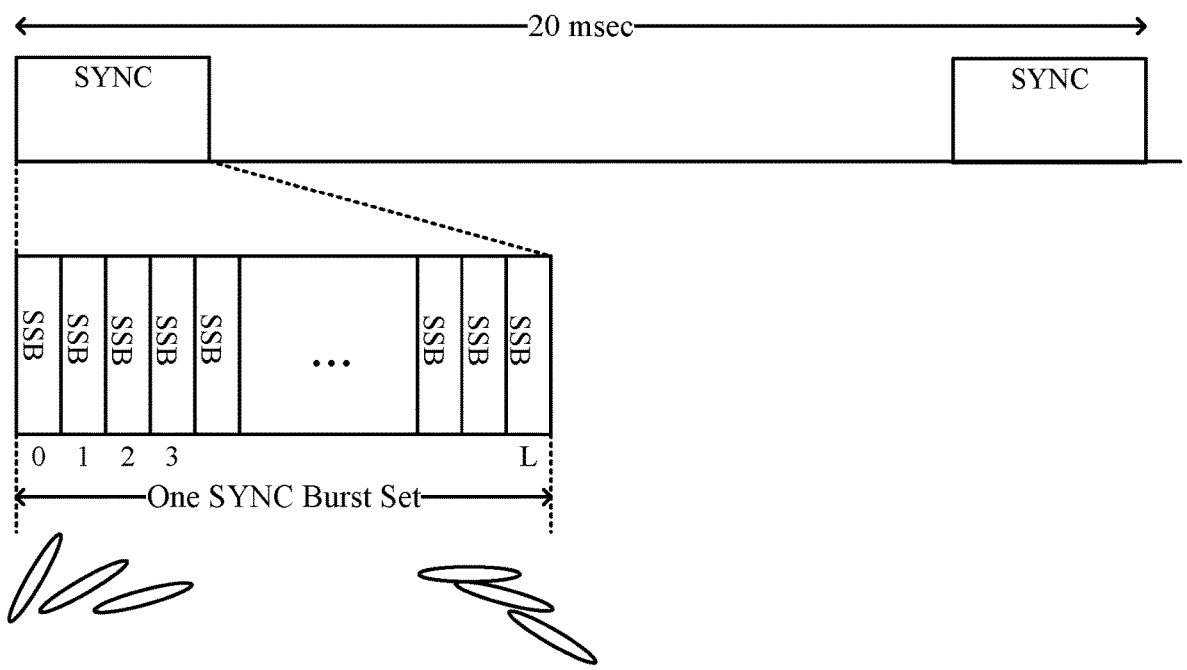
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Orphan Symbol Handling in Shared Spectrum

Aspects of the present disclosure provide techniques for a UE to handle scenarios where a physical uplink shared channel (PUSCH) repetition is scheduled as a single symbol (an orphan symbol) on shared spectrum.

Shared spectrum, in this context, may include unlicensed and also licensed frequency bands on which there is a medium access sharing mechanism, such as a listen before talk (LBT) mechanism. The handling may involve taking one or more actions designed to avoid losing channel access due to a transmission gap caused by the orphan symbol.

Aspects of the present disclosure may be used to provide uplink enhancements in certain systems, such as new radio unlicensed (NR-U) utilized such shared spectrum to provide uplink enhancements. For example, aspects of the present disclosure may be used to help a UE maintain access to a shared medium for certain types of traffic, such as URLLC and may help support UE-initiated channel occupancy times COTs for frame based equipment (FBE) operating modes.

Such applications may improve reliability of physical uplink shared channel (PUSCH) through the use of repetition. According to one type of repetition (referred to as Type B), a UE is configured to transmit K nominal repetitions of PUSCH, each with nominal length (number of symbols) L, back-to back starting from a starting symbol S, where S and L are given by a parameter referred to as a starting length and indicator vector (SLIV). A SLIV is typically indicated by a row index in a time domain resource allocation (TDRA) signaled in downlink control information (DCI) for a scheduled PUSCH.

The K repetitions may be referred to as nominal because, depending on an available resource configuration, the number of actual repetitions may be different. For example, based on the parameters K, L, and S, a UE may determine a certain number of symbols are not valid for use in the PUSCH repetitions. These invalid symbols may be determined based on predefined rules or RRC configuration.

After determining invalid symbol(s) for a PUSCH repetition type B transmission for each of the K nominal repetitions, the remaining symbols are considered as potentially valid symbols for PUSCH repetition Type B transmission. If the number of potentially valid symbols for PUSCH repetition type B transmission is greater than zero for a nominal repetition, the nominal repetition may be segmented one or more actual repetitions, where each actual repetition may be a consecutive set of one or more potentially valid symbols that can be used for PUSCH repetition Type B transmission within a slot. In conventional systems, such single symbol PUSCH repetitions are not transmitted.

Figure 4A:
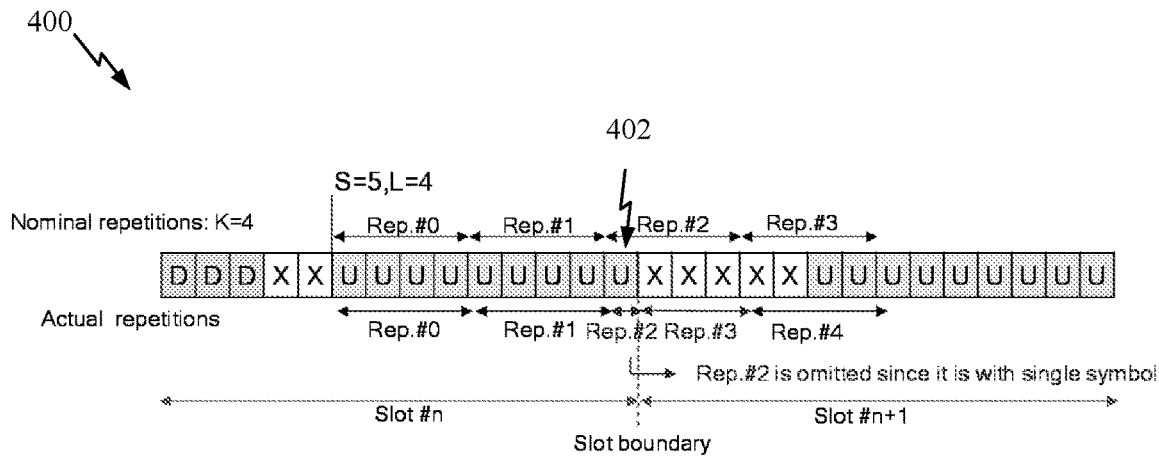
FIGS. 4A-4C illustrate examples of PUSCH repetitions that comprise a single symbol, that may be handled in accordance with aspects of the present disclosure.
Figure 4B:
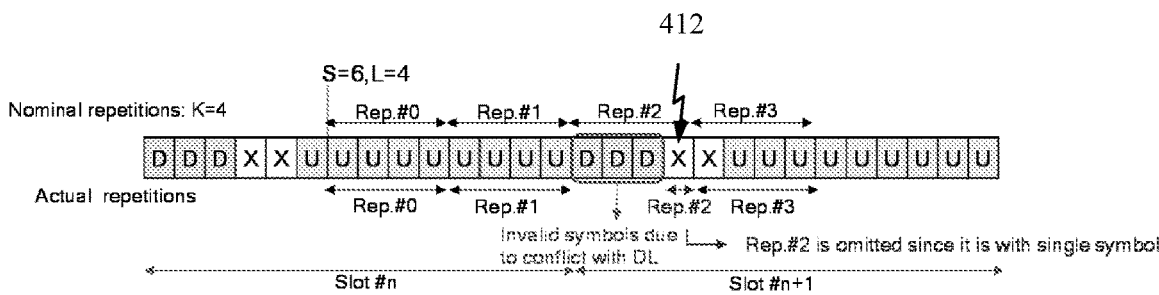
Figure 4C:
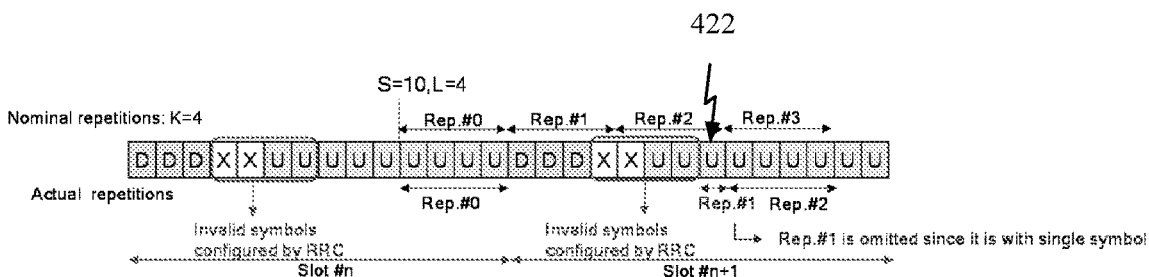

FIGS. 4A-4C illustrate example scenarios that result in a single symbol PUSCH repetition.

In the example shown in FIG. 4A, the repetition parameters (K=4, S=5, and L=4) and subframe configuration result in one nominal repetition (nominal Repetition #2) being split into two actual repetitions (actual Repetitions #2 and #3) since the nominal repetition crosses a slot boundary. As shown, in a conventional system, actual Repetition #2 would be omitted since it is a single symbol.

In the example shown in FIG. 4B, the repetition parameters (K=4, S=6, and L=4) and subframe configuration again result in one nominal repetition (nominal Repetition #2) being segmented into a single symbol actual repetition (actual Repetition #2), in this case due to a conflict with semi-static downlink symbols. As shown, in a conventional system, actual Repetition #2 would be omitted since it is a single symbol.

In the example shown in FIG. 4C, the repetition parameters (K=4, S=10, and L=4) and subframe configuration again result in one nominal repetition (nominal Repetition #2) being segmented into a single symbol actual repetition (actual Repetition #1), in this case due to RRC configured invalid symbols. As shown, in a conventional system, actual Repetition #1 would be omitted since it is a single symbol.

As demonstrated by the examples above, in certain scenarios for type B PUSCH repetition, due to segmentation, there is a chance that an actual PUSCH repetition comprises a single symbol. In typical systems and applications (e.g., Rel. 16 URLLC) the decision is to not transmit the actual repetition with single symbol (the orphan symbol), as there is typically no one symbol PUSCH format to support a single symbol.

Unfortunately, in shared spectrum systems such as NR-U, leaving a one symbol gap may result in loss of the channel for the UE. Aspects of the present disclosure provide techniques for a UE to handle such scenarios where a PUSCH repetition is scheduled as a single symbol (an orphan symbol).

Figure 5:
FIG. 5 illustrates example operations for wireless communication by a user equipment (UE), in accordance with some aspects of the present disclosure.

FIG. 5 illustrates example operations 500 for wireless communications by a UE. For example, operations 500 may be performed by a UE 120 of FIG. 1 or FIG. 2 to handle orphan symbols, in accordance with aspects of the present disclosure.

Operations 500 begin, at 502, by detecting that a nominal physical uplink shared channel (PUSCH) repetition is to be segmented into one or more actual PUSCH repetitions that include a single symbol actual PUSCH repetition. At 504, the UE takes one or more actions to handle a symbol length gap in transmission due to the single symbol actual PUSCH repetition.

In some cases, if there is actual repetition transmitted after the orphan symbol (e.g., a single-symbol actual repetition), the UE may use a CP extension from the next actual repetition to fill the one symbol gap (corresponding to the orphan symbol). This CP extension approach may be applicable, for example, in cases where the UE is transmitting (e.g., PUSCH repetitions) before the 1-symbol segment.

Figures 6, 6A, 6B:
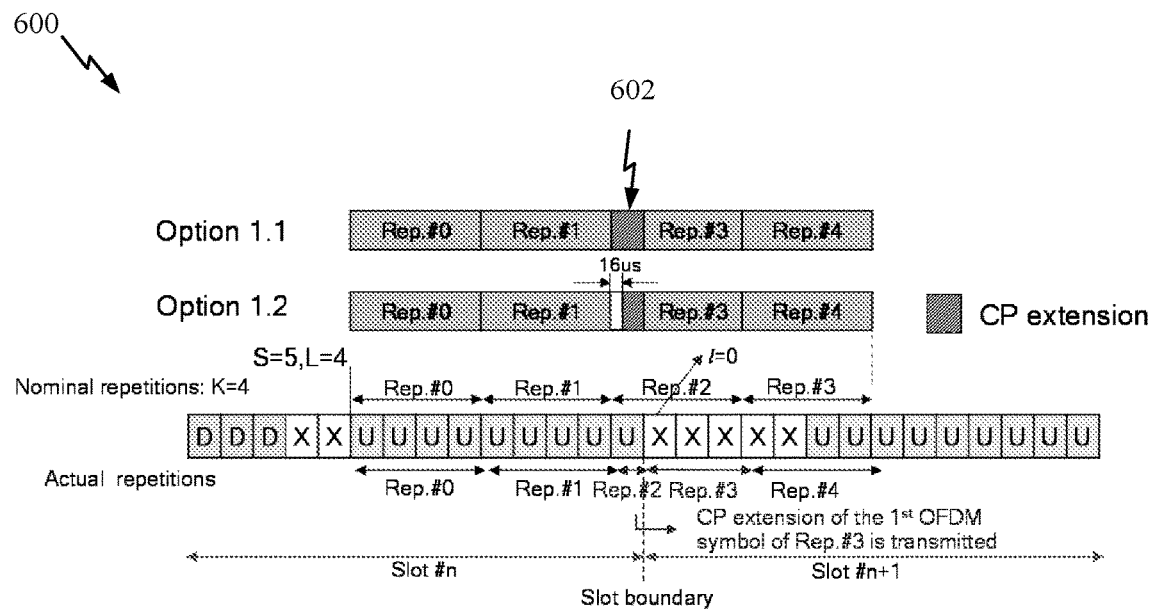
FIG. 6 illustrates an example of how to handle PUSCH repetitions that comprise a single symbol, in accordance with aspects of the present disclosure.
FIGS. 6A and 6B illustrate examples of cyclic prefix (CP) extensions, in accordance with aspects of the present disclosure.

FIG. 6 illustrates an example timeline 600 that illustrates how CP extension 602 may be used to handle an orphan symbol. In the illustrated example, the repetition parameters (K=4, S=5, and L=4) and subframe configuration are the same as the example of FIG. 4A. Thus, actual Repetition #2 is a single symbol due to a split across slot boundary. As illustrated, the UE may apply CP extension of the 1st OFDM symbol of the next actual repetition (actual Repetition #3) to fill the one symbol gap.

As illustrated, according to a first option (labeled Option 1.1), the length of the CP extension may be a symbol length:

$$T_{ext} = T_{symb,(l-1) mod\ 7 \cdot 2^\mu},$$

where μ is the subcarrier spacing (SCS) of the uplink (UL) bandwidth part (BWP), and l is the first OFDM symbol index of the next actual repetition after the orphan symbol. In some cases, an advanced receiver may take advantage of this CP extension for better LLR or better channel estimation. According to a second option (labeled Option 1.2), the CP extension may be a less than a full symbol period (by a delta value). In this case, the length of the CP extension may be:

$$T_{symb,(l-1) mod\ 7 \cdot 2^\mu} - 16 \cdot 10^{-6} \le T_{ext} < T_{symb,(l-1) mod\ 7 \cdot 2^\mu}$$

(to ensure the gap is no more than 16 us), again where μ is the subcarrier spacing (SCS) of the uplink (UL) bandwidth part (BWP), and l is the first OFDM symbol index of the next actual repetition after the orphan symbol.

$$T^\mu_{symb,l} = (N^\mu_u + N^\mu_{CP,l})T_c;\ \text{and}$$

$$N^\mu_u = 2048\kappa \cdot 2^{-\mu}$$

$$N^\mu_{CP,l} = \begin{cases} 512\kappa \cdot 2^{-\mu} & \text{extended cyclic prefix} \\ 144\kappa \cdot 2^{-\mu} + 16\kappa & \text{normal cyclic prefix}, l = 0\ \text{or}\ l = 7 \cdot 2^\mu \\ 144\kappa \cdot 2^{-\mu} & \text{normal cyclic prefix}, l \ne 0\ \text{and}\ l \ne 7 \cdot 2^\mu \end{cases}$$

FIGS. 6A and 6B illustrate examples of the length of the CP extension for different SCS for normal CP according to the first and second options, respectively.

In some cases, if there is no actual repetition transmitted after the orphan symbol, the UE may drop (not transmit) the single symbol PUSCH repetition.

Figure 7:
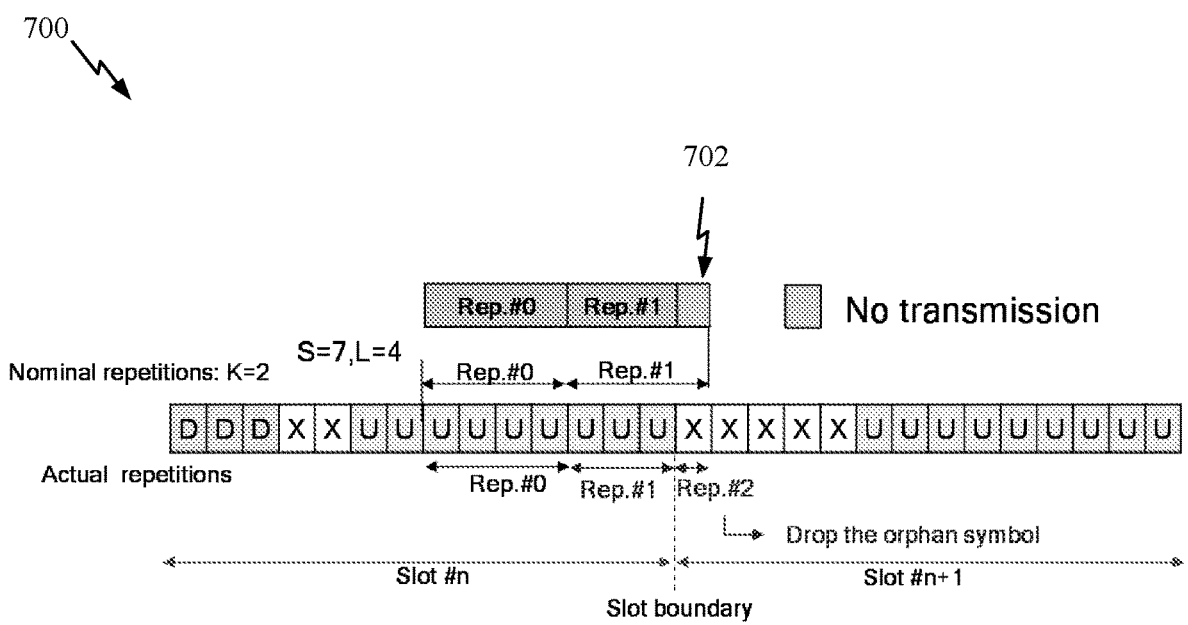
FIG. 7 illustrates an example of how to handle PUSCH repetitions that comprise a single symbol, in accordance with aspects of the present disclosure.

FIG. 7 illustrates an example timeline 700 of such a solution. In the example shown in FIG. 7, the repetition parameters (K=2, S=7, and L=4) and subframe configuration again result in one nominal repetition (nominal Repetition #2) being segmented into a single symbol actual repetition 702. In this case, the orphan symbol may be dropped because, with no transmission after, it may not be considered a gap. If the one symbol is at the end of a burst, as in this example, since both gNB and UE know about this, the gNB can schedule the next transmission accordingly, with the cancellation of this symbol in mind. This approach may be used to address a single symbol PUSCH repetition, caused by any of the examples shown in FIGS. 4A-4C.

In some cases, if there is an orphan symbol, the UE may treat the configuration as an error case (e.g., and not transmit any, or one or more of the repetitions). Such cases may be resolved by scheduling, for example, by a gNB avoiding parameter settings that result in an orphan symbol.

Figures 8A, 8B:
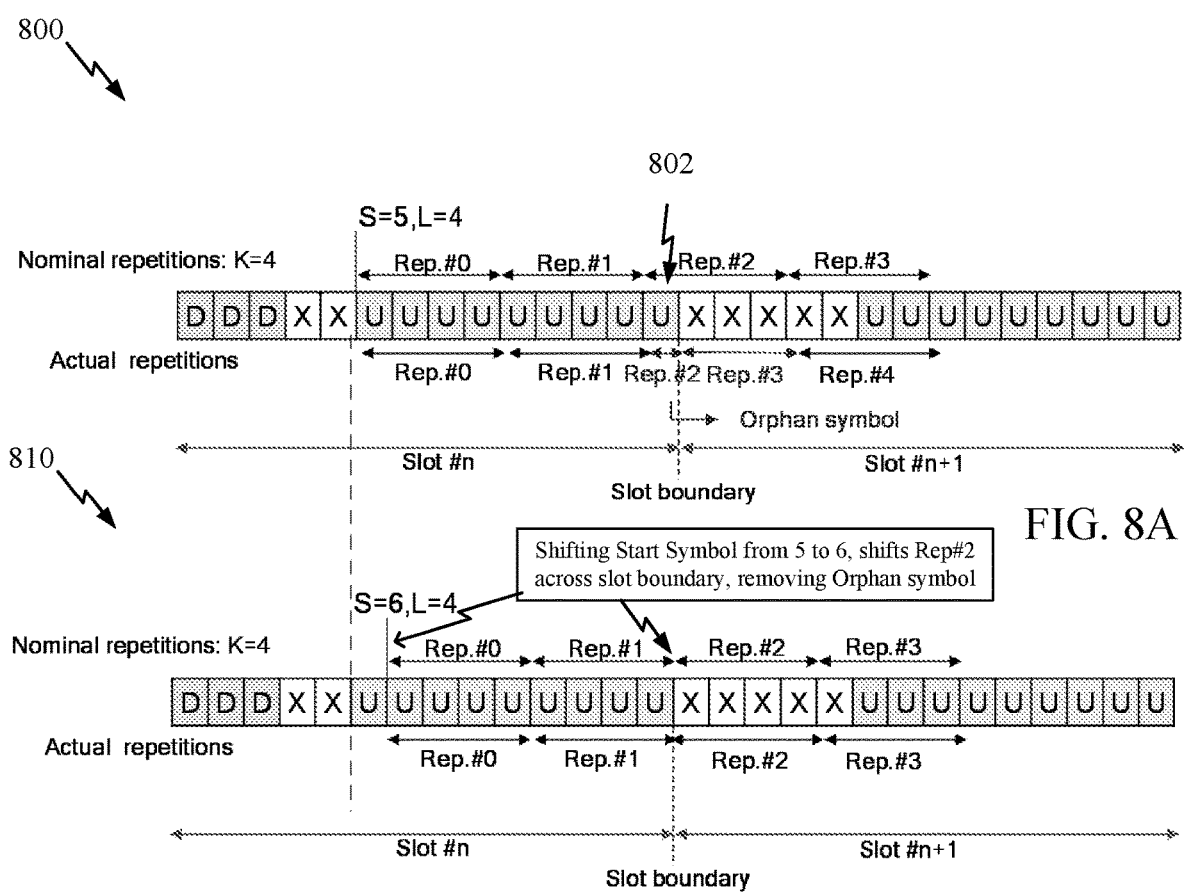
FIGS. 8A and 8B illustrate another example of how to handle PUSCH repetitions that comprise a single symbol, in accordance with aspects of the present disclosure.

For example, the orphan symbol 802 resulting in the parameter settings shown in in the example timeline 800 FIG. 8A (K=4, S=5, and L=4) may be avoided by setting different parameters. As shown in the example timeline 810 FIG. 8B, using new parameters (K=4, S=6, and L=4) that shift the starting symbol in time by one symbol, shifts nominal repetition #2 such that it is no longer split across the slot boundary, effectively removing the orphan symbol. This approach may be used to address a single symbol PUSCH repetition, caused by any of the examples shown in FIGS. 4A-4C.

Figure 9A:
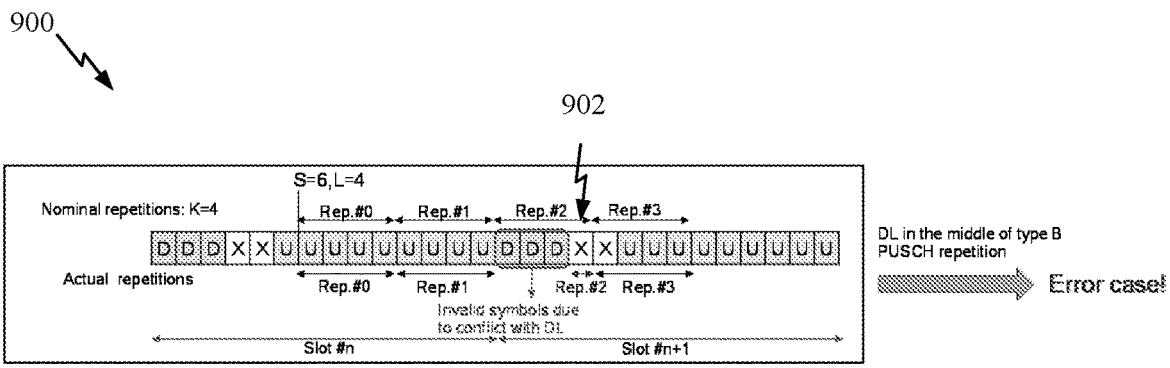
FIGS. 9A and 9B illustrate another example of how to handle PUSCH repetitions that comprise a single symbol, in accordance with aspects of the present disclosure.
Figure 9B:
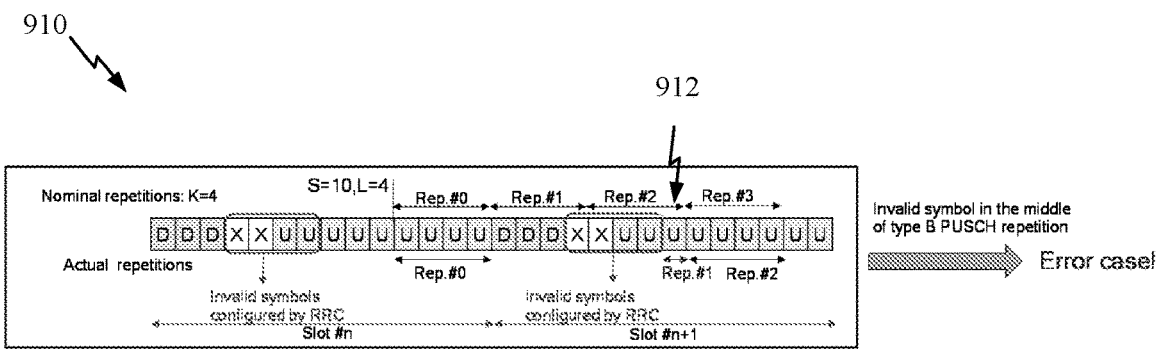

In some cases, if there are DL or invalid symbols in the middle of a Type B PUSCH repetition, the UE may treat such cases as error cases, so that in unlicensed bands the UE does not expect to receive a type B PUSCH repetition configuration which includes DL or invalid symbols in the middle. FIG. 9A illustrates an example timeline 900 of such a scenario with repetition parameters (K=4, S=6, and L=4) and subframe configuration that result in an orphan symbol 902 due to a conflict with (invalid) downlink symbols. FIG. 9B illustrates an example timeline 910 of another such scenario with repetition parameters (K=4, S=10, and L=4) and subframe configuration that result in an orphan symbol 912 due to invalid symbols configured by RRC. A UE may consider each of these scenarios an error case. As such, a gNB should avoid scheduling with such parameters and subframe configurations. This approach may be used to address a single symbol PUSCH repetition, caused by any of the examples shown in FIGS. 4B-4C.

In some cases, if there are DL and/invalid symbols in the middle of a Type B PUSCH repetition, the UE may take action to maintain channel access.

Figure 10:
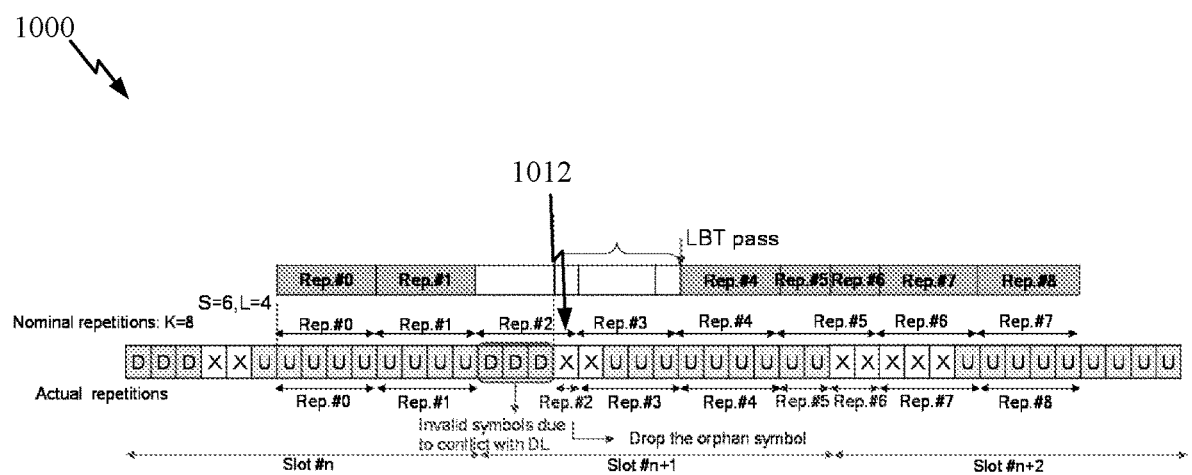
FIG. 10 illustrates another example of how to handle PUSCH repetitions that comprise a single symbol, in accordance with aspects of the present disclosure.

For example, as illustrated in the example timeline 1000 of FIG. 10, with repetition parameters (K=8, S=6, and L=4) and subframe configuration that result in an orphan symbol 1012 due to a conflict with DL symbols, the UE may use channel access procedures such as Type 1 uplink channel access referred to as category 4 (Cat 4) listen before talk (LBT) to attempt to start a transmission at each of the repetition boundaries. In some cases, the UE may drop the orphan symbol (single symbol actual repetition #2) in the beginning. In some cases, after transmission has started, the UE may effectively use the CP extension proposal (discussed above with reference to FIG. 6) for single symbol actual repetition in the middle. This approach may be used to address a single symbol PUSCH repetition, caused by any of the examples shown in FIGS. 4B-4C.

Figure 11:
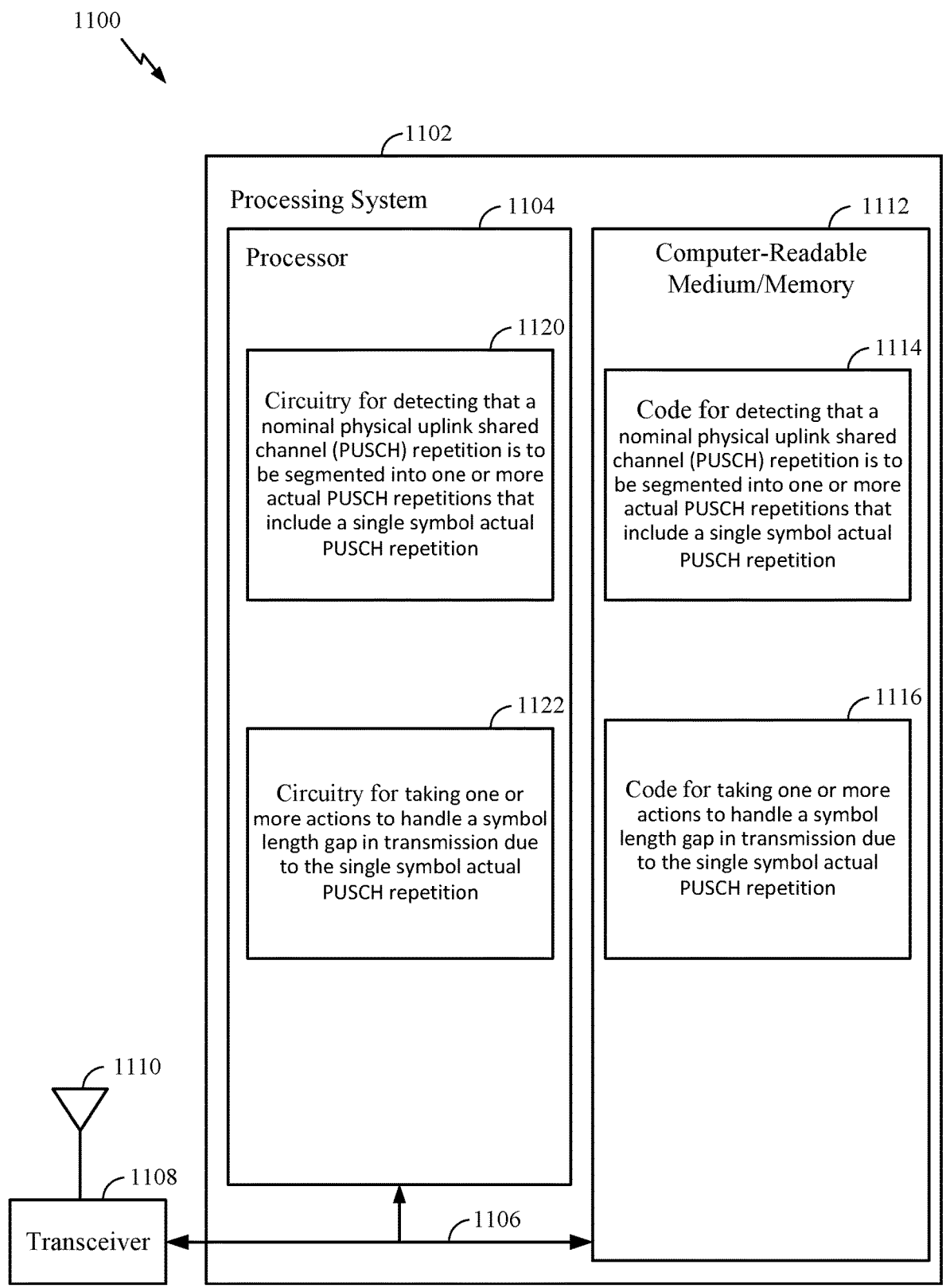
FIG. 11 illustrates a communications device that may include various components configured to perform the operations illustrated in FIG. 5, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 5. For example, communication device 1100 may be a UE 120, such as shown in FIG. 1 or FIG. 2. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 5, or other operations for performing the various techniques discussed herein. In certain aspects, computer-readable medium/memory 1112 stores code 1114 for detecting that a nominal physical uplink shared channel (PUSCH) repetition is to be segmented into one or more actual PUSCH repetitions that include a single symbol actual PUSCH repetition; and code 1116 for taking one or more actions to handle a symbol length gap in transmission due to the single symbol actual PUSCH repetition. In certain aspects, the processor 1104 has circuitry configured to implement the code stored in the computer-readable medium/memory 1112. The processor 1104 includes circuitry 1120 for detecting that a nominal physical uplink shared channel (PUSCH) repetition is to be segmented into one or more actual PUSCH repetitions that include a single symbol actual PUSCH repetition; and circuitry 1122 for taking one or more actions to handle a symbol length gap in transmission due to the single symbol actual PUSCH repetition. Circuitry 1120 and/or 1122 could be specially designed circuitry for performing the indicated functions or could be general purpose circuitry configured or programmed to perform these functions.

Additional Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20

MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120 and/or processors 220, 230, 238, and/or controller/processor 240 of the BS 110 shown in FIG. 2 may be configured to perform operations 500 of FIG. 5.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for detecting and means for taking one or more actions may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   detecting that a nominal physical uplink shared channel (PUSCH) repetition is to be segmented into one or more actual PUSCH repetitions that include a single symbol actual PUSCH repetition; and
   taking one or more actions to handle a symbol length gap in a transmission due to the single symbol actual PUSCH repetition,
   wherein the one or more actions comprise using a cyclic prefix (CP) extension from an actual PUSCH repetition after the single symbol actual PUSCH repetition.

2. The method of claim 1, wherein the length of the CP extension is a single symbol duration.

3. The method of claim 1, wherein the length of the CP extension occupies less than a symbol duration and equal to or larger than the symbol duration less a delta value.

4. The method of claim 1, wherein the one or more actions comprise:
   dropping the single symbol actual PUSCH repetition if there is no actual PUSCH repetition scheduled after the single symbol actual PUSCH repetition.

5. The method of claim 1, wherein the one or more actions comprise:
   treating the detection of the single symbol actual PUSCH repetition as an error case.

6. The method of claim 1, further comprising:
   detecting semi-static downlink symbols or radio resource control (RRC) configured invalid symbols in the middle of the one or more actual PUSCH repetitions, wherein:
   the one or more actions comprise treating the detection of the semi-static downlink symbols or the radio resource control (RRC) configured invalid symbols in the middle of the one or more actual PUSCH repetitions as an error case.

7. The method of claim 1, wherein the one or more actions are taken based, at least in part, on how the single symbol actual PUSCH repetition was detected.

8. The method of claim 7, wherein a different one of the one or more actions is taken depending on whether the nominal PUSCH repetition was detected as a result of:
   the nominal PUSCH repetition crosses a slot boundary;
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

9. The method of claim 1, wherein the one or more actions comprise:
   using an uplink channel procedure to resume the transmission at a boundary of each of the one or more actual PUSCH repetitions if the nominal PUSCH repetition was detected as a result of:
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

10. The method of claim 9, wherein the one or more actions further comprise:
    dropping the single symbol actual PUSCH repetition immediately after the semi-static downlink symbols or the radio resource control (RRC) configured invalid symbols.

11. An apparatus for wireless communications by a user equipment (UE), comprising:
    a processing system configured to:
    detect that a nominal physical uplink shared channel (PUSCH) repetition is to be segmented into one or more actual PUSCH repetitions that include a single symbol actual PUSCH repetition; and
    take one or more actions to handle a symbol length gap in a transmission due to the single symbol actual PUSCH repetition,
    wherein the one or more actions comprise using a cyclic prefix (CP) extension from an actual PUSCH repetition after the single symbol actual PUSCH repetition.

12. The apparatus of claim 11, wherein the length of the CP extension is a single symbol duration.

13. The apparatus of claim 11, wherein the length of the CP extension occupies less than a symbol duration and equal to or larger than the symbol duration less a delta value.

14. The apparatus of claim 11, wherein the one or more actions comprise:
    dropping the single symbol actual PUSCH repetition if there is no actual PUSCH repetition scheduled after the single symbol actual PUSCH repetition.

15. The apparatus of claim 11, wherein the one or more actions comprise:
    treating the detection of the single symbol actual PUSCH repetition as an error case.

16. The apparatus of claim 11, further comprising:
   detecting semi-static downlink symbols or radio resource control (RRC) configured invalid symbols in the middle of the one or more actual PUSCH repetitions, wherein:
   the one or more actions comprise treating the detection of the semi-static downlink symbols or the radio resource control (RRC) configured invalid symbols in the middle of the one or more actual PUSCH repetitions as an error case.

17. The apparatus of claim 11, wherein the one or more actions are taken based, at least in part, on how the single symbol actual PUSCH repetition was detected.

18. The apparatus of claim 17, wherein a different one of the one or more actions is taken depending on whether the nominal PUSCH repetition was detected as a result of:
   the nominal PUSCH repetition crosses a slot boundary;
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

19. The apparatus of claim 11, wherein the one or more actions comprise using an uplink channel procedure to resume the transmission at a boundary of each of the one or more actual PUSCH repetitions if the nominal PUSCH repetition was detected as a result of:
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

20. The apparatus of claim 19, wherein the one or more actions further comprise:
   dropping the single symbol actual PUSCH repetition immediately after the semi-static downlink symbols or the radio resource control (RRC) configured invalid symbols.

21. An apparatus for wireless communications by a user equipment (UE), comprising:
   means for detecting that a nominal physical uplink shared channel (PUSCH) repetition is to be segmented into one or more actual PUSCH repetitions that include a single symbol actual PUSCH repetition; and
   means for taking one or more actions to handle a symbol length gap in a transmission due to the single symbol actual PUSCH repetition,
   wherein the one or more actions comprise using a cyclic prefix (CP) extension from an actual PUSCH repetition after the single symbol actual PUSCH repetition.

22. The apparatus of claim 21, wherein the length of the CP extension is a single symbol duration.

23. The apparatus of claim 21, wherein the length of the CP extension occupies less than a symbol duration and equal to or larger than the symbol duration less a delta value.

24. The apparatus of claim 21, wherein the one or more actions comprise:
   dropping the single symbol actual PUSCH repetition if there is no actual PUSCH repetition scheduled after the single symbol actual PUSCH repetition.

25. The apparatus of claim 21, wherein the one or more actions comprise:
   treating the detection of the single symbol actual PUSCH repetition as an error case.

26. The apparatus of claim 21, further comprising:
   means for detecting semi-static downlink symbols or radio resource control (RRC) configured invalid symbols in the middle of the one or more actual PUSCH repetitions, wherein:
   the one or more actions comprise treating the detection of the semi-static downlink symbols or the radio resource control (RRC) configured invalid symbols in the middle of the one or more actual PUSCH repetitions as an error case.

27. The apparatus of claim 21, wherein the one or more actions are taken based, at least in part, on how the single symbol actual PUSCH repetition was detected.

28. The apparatus of claim 27, wherein a different one of the one or more actions is taken depending on whether the nominal PUSCH repetition was detected as a result of:
   the nominal PUSCH repetition crosses a slot boundary;
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

29. The apparatus of claim 21, wherein the one or more actions comprise using an uplink channel procedure to resume the transmission at a boundary of each of the one or more actual PUSCH repetitions if the nominal PUSCH repetition was detected as a result of:
   the nominal PUSCH repetition is segmented into the one or more actual PUSCH repetitions due to a conflict with semi-static downlink symbols; or
   the nominal PUSCH repetition is segmented into the one or more actual PUSCH repetitions due to an overlap with radio resource control (RRC) configured invalid symbols.

30. The apparatus of claim 29, wherein the one or more actions further comprise:
   dropping the single symbol actual PUSCH repetition immediately after the semi-static downlink symbols or the radio resource control (RRC) configured invalid symbols.

31. A user equipment (UE), comprising:
   at least one antenna; and
   a processing system configured to:
      detect that a nominal physical uplink shared channel (PUSCH) repetition is to be segmented into one or more actual PUSCH repetitions that include a single symbol actual PUSCH repetition; and
      take one or more actions, via the at least one antenna, to handle a symbol length gap in a transmission due to the single symbol actual PUSCH repetition,
   wherein the one or more actions comprise using a cyclic prefix (CP) extension from an actual PUSCH repetition after the single symbol actual PUSCH repetition.

32. A computer-readable medium for wireless communications by a user equipment (UE), comprising codes executable to:
   detect that a nominal physical uplink shared channel (PUSCH) repetition is to be segmented into one or more actual PUSCH repetitions that include a single symbol actual PUSCH repetition; and
   take one or more actions to handle a symbol length gap in a transmission due to the single symbol actual PUSCH repetition, wherein the one or more actions comprise using a cyclic prefix (CP) extension from an actual PUSCH repetition after the single symbol actual PUSCH repetition.

\* \* \* \* \*